United States Patent [19]

Wirt

[11] 4,108,224

[45] Aug. 22, 1978

[54] TREE SHEAR TILTING MECHANISM

[75] Inventor: Leon A. Wirt, Joliet, Ill.

[73] Assignee: Caterpillar Tractor Co., Peoria, Ill.

[21] Appl. No.: 731,966

[22] Filed: Oct. 13, 1976

[51] Int. Cl.² ............................................. A01G 23/08
[52] U.S. Cl. ................................ 144/34 E; 144/3 D; 214/3; 214/147 G; 294/106
[58] Field of Search ......... 214/DIG. 10, 1 BC, 1 BD, 214/3, 147 R, 147 G; 144/2 Z, 3 D, 34 R, 34 E, 309 AC; 37/2 R; 254/132, 124; 294/88, 70, 106, 118

[56] References Cited

U.S. PATENT DOCUMENTS

| | | | |
|---|---|---|---|
| 2,814,396 | 11/1957 | Neale, Sr. ................................ 214/3 |
| 3,461,928 | 8/1969 | Siiro .................................... 144/34 R |
| 3,498,347 | 3/1970 | Vit .................................. 144/34 R X |
| 3,521,860 | 7/1970 | Zehrung, Jr. et al. ........... 254/124 X |
| 3,590,894 | 7/1971 | Boyd ..................................... 144/3 D |
| 3,651,966 | 3/1972 | Willett ............................. 214/147 G |
| 3,823,916 | 7/1974 | Shaw ................................... 214/3 X |
| 3,881,615 | 5/1975 | Albright .......................... 214/147 G |
| 3,938,681 | 2/1976 | Bennett et al. .................. 214/147 G |
| 3,970,125 | 7/1976 | Muirhead et al. ............. 144/309 AC |

Primary Examiner—Gil Weidenfeld
Assistant Examiner—W. D. Bray
Attorney, Agent, or Firm—Phillips, Moore, Weissenberger, Lempio, Majestic

[57] ABSTRACT

A vehicle has a tree shear mechanism mounted thereto, which is raisable and lowerable relative to the vehicle. The tree shear mechanism may also be tilted about a longitudinal axis of the vehicle so that with the vehicle on ground of one level and slope, and the tree to be sheared on another ground level and slope, the tree shear mechanism can be properly positioned for appropriate shearing of the tree.

15 Claims, 6 Drawing Figures

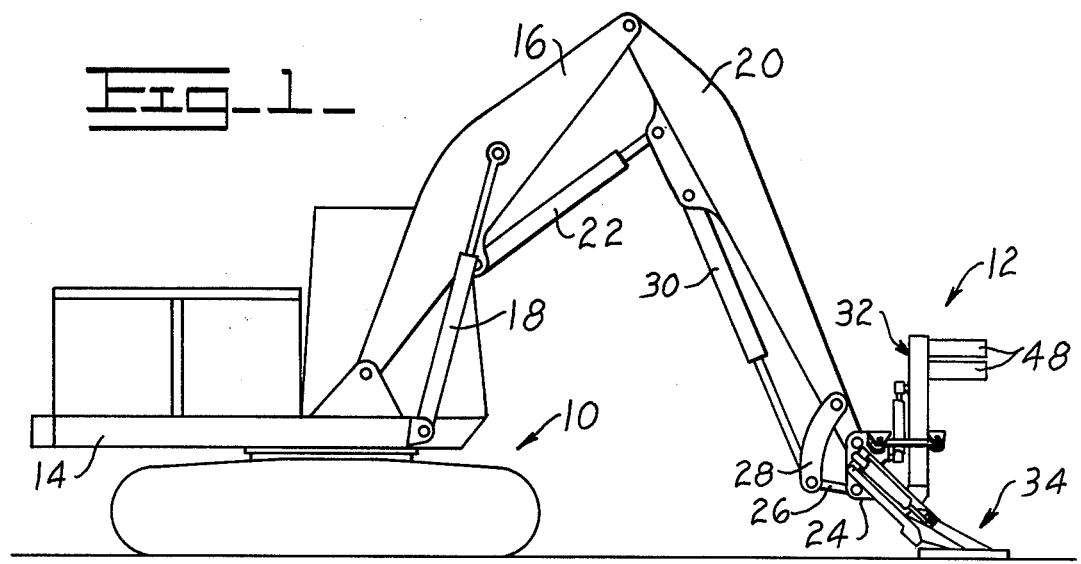
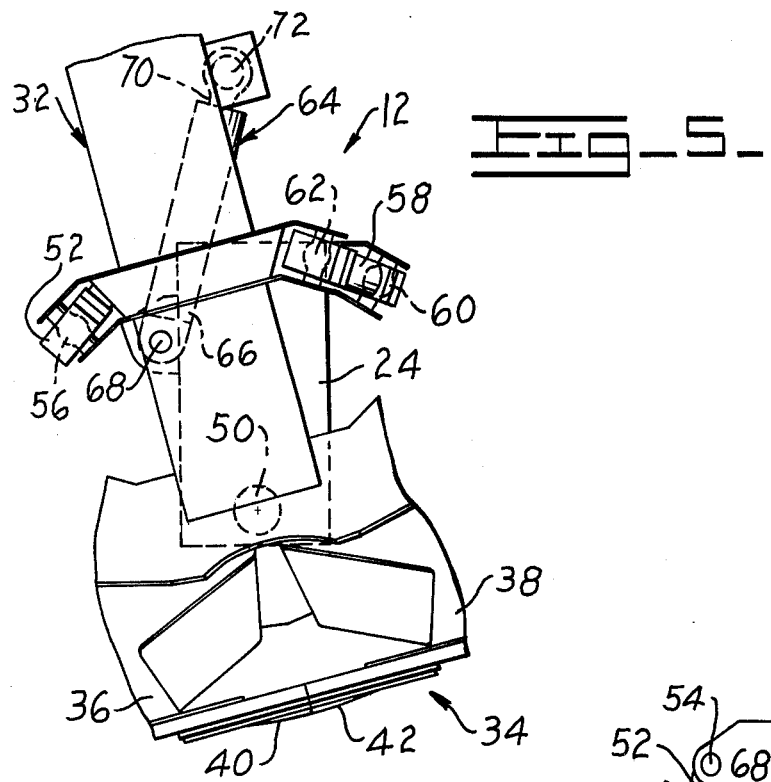
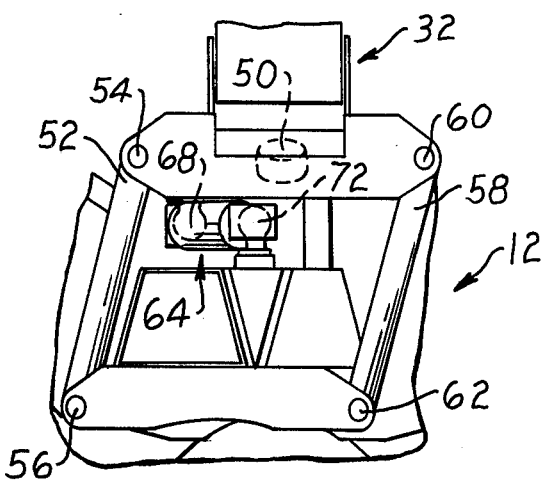

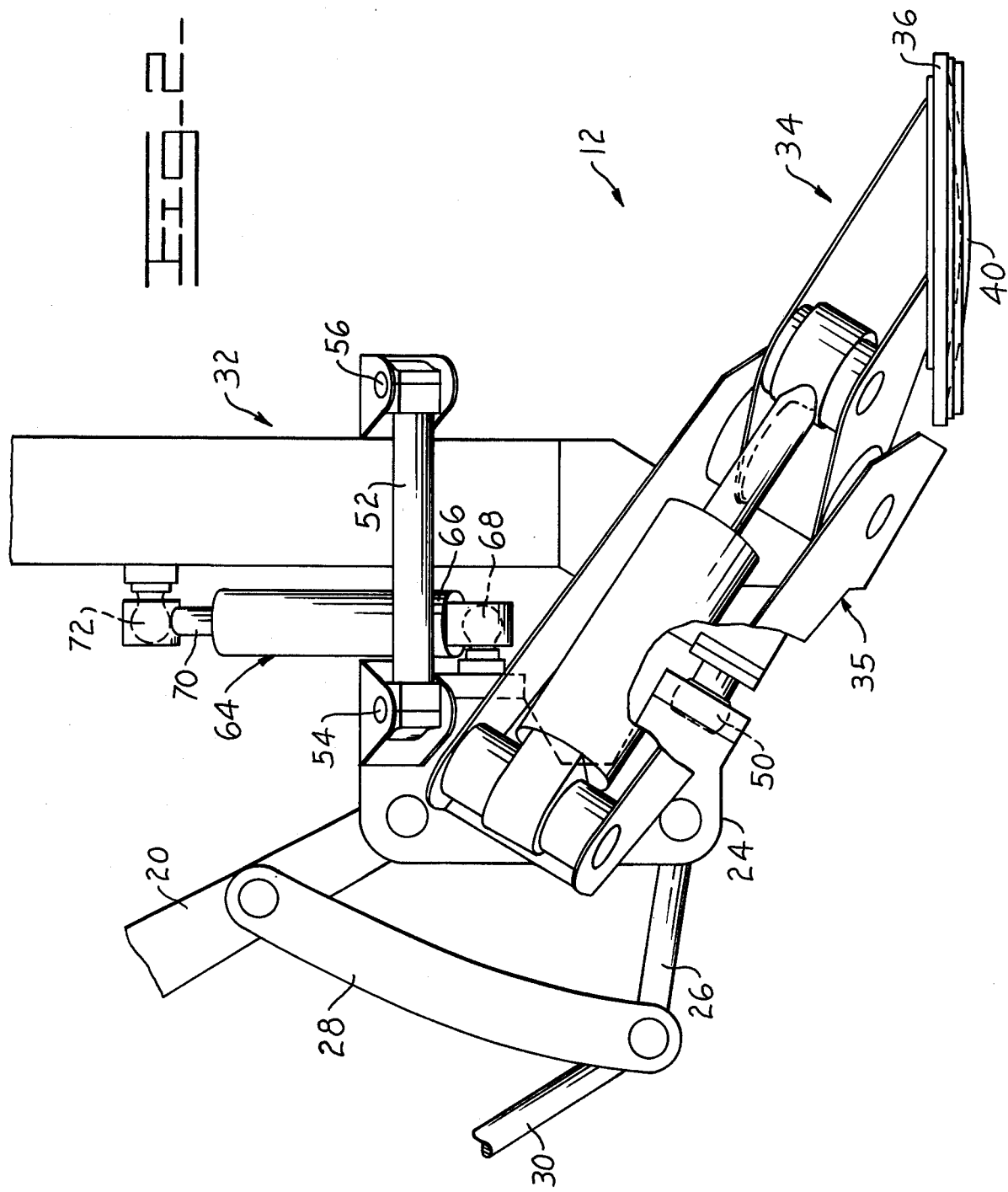

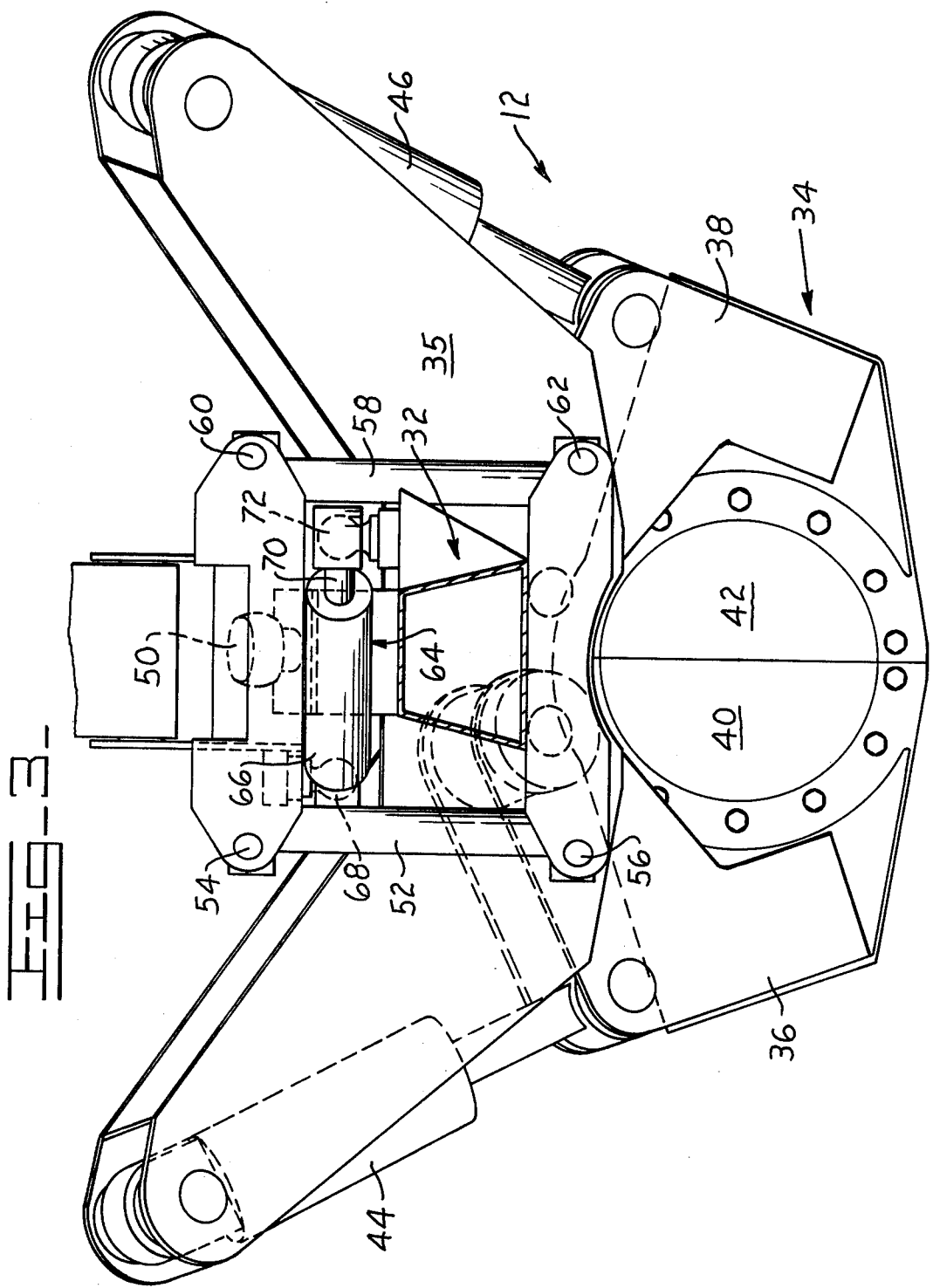

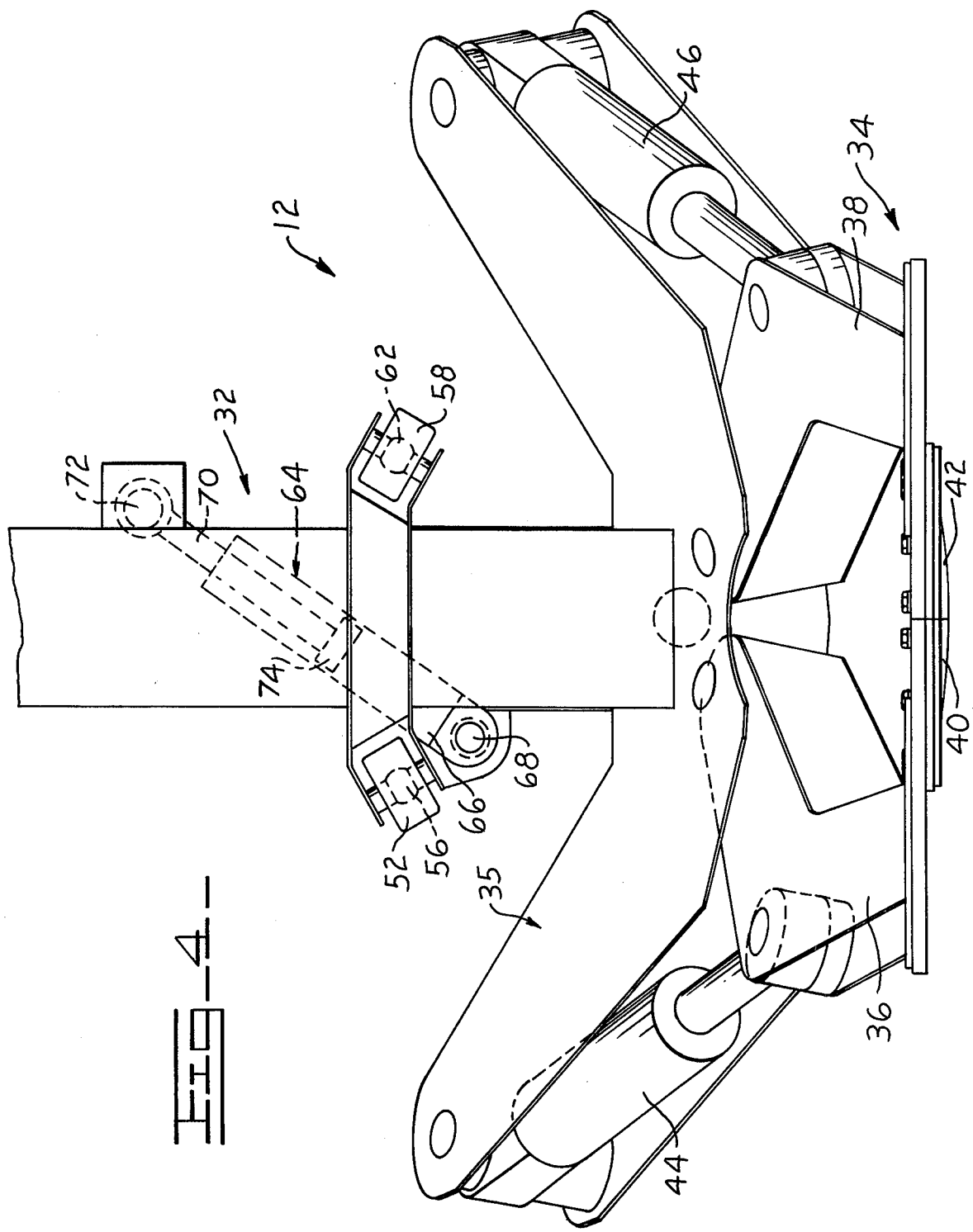

TREE SHEAR TILTING MECHANISM

BACKGROUND OF THE INVENTION

This invention relates to tree shear apparatus, and more particularly, to such an apparatus mounted on a vehicle.

In the shearing of a tree on uneven terrain, it will be understood that the vehicle carrying the tree shear mechanism may be positioned on an area of ground having a certain height and slope differing from the height and slope of the land on which the tree is located. Thus, it will be understood that it is highly desirable to provide means for shifting the position of the tree shear mechanism relative to the vehicle to allow for such unevenness of terrain. U.S. Pat. No. 3,498,347 and U.S. Pat. No. 3,531,235 disclose systems wherein a tree shear mechanism can be positioned relative to a vehicle to generally allow for such unevenness in terrain. However, each of these systems depends on a single pivot on which the tree shear mechanism is mounted without any other means for guiding movement of the tree shear mechanism and supporting the loads thereon due to, for example, the carrying of a tree therein, upon pivoting of such tree shear mechanism.

SUMMARY OF THE INVENTION

It is accordingly an object of this invention to provide a mounting apparatus for a tree shear mechanism which, in association with, for example, a vehicle, allows for proper positioning of the tree shear mechanism relative to the vehicle, allowing for unevenness of operating terrain.

It is a further object of this invention to provide mounting apparatus which, while fulfilling the above object, provides for proper guiding movement of the tree shear mechanism during such movement thereof.

It is a still further object of this invention to provide mounting apparatus which, while fulfilling the above objects, is highly effective in use.

Broadly stated, the invention comprises a mounting apparatus for a tree shear mechanism, the tree shear mechanism comprising a frame and shear means operatively mounted thereto. The mounting apparatus comprises a body, and pivot means interconnecting the body and frame of the tree shear mechanism. Link means interconnect the body and frame for guiding movement of the frame as the frame is pivoted relative to the body through the pivot means interconnecting the body and frame. Means are included for so pivoting the frame relative to the body.

BRIEF DESCRIPTION OF THE DRAWINGS

These and other objects of the invention will become apparent from a study of the following specification and drawings, in which:

FIG. 1 is an overall side elevation of apparatus including the invention;

FIG. 2 is a side elevation of the tree shear mechanism;

FIG. 3 is a plan view of the tree shear mechanism as shown in FIG. 2;

FIG. 4 is a front elevation of the tree shear mechanism as shown in FIGS. 2 and 3;

FIG. 5 is a front elevation of a portion of the apparatus as shown in FIG. 4 showing a tilt position of the tree shear mechanism; and FIG. 6 is a plan view of the apparatus as shown in FIG. 5.

DESCRIPTION OF THE PREFERRED EMBODIMENT

Shown in FIG. 1 is a track-type vehicle 10 which, for example, may be of the type which normally includes an excavating implement thereon. However, in place of such excavating implement is a tree shear mechanism 12. More specifically, the vehicle 10 includes a frame 14 to which is pivotally mounted a boom 16. A cylinder 18 interconnects the frame 14 and boom 16, for selectively raising and lowering the boom 16. A stick arm 20 is pivotally mounted to the extending end of the boom 16, and a cylinder 22 interconnects the boom 16 and stick arm 20 to provide raising and lowering of the stick arm 20 relative to the boom 16.

Pivotally mounted to the extending end of the stick arm 20 is a body 24. A link 26 is pivotally mounted to the body 24 and extends therefrom, and a connecting link 28 is pivotally mounted to the stick arm 20 adjacent the extended end thereof and the extended end of the link 26. A cylinder 30 interconnects the stick arm 20 and the pivotal connection of the links 26, 28, so that extension and retraction of the cylinder 30 provides for tilting of the body 24 about an axis transverse of the vehicle 10.

The tree shear mechanism 12 includes a body or frame 32 having shear means 34 operatively mounted thereto, the frame 32 being mounted forwardly of the body 24. The shear means 34 include a support frame 35 to which are pivotally mounted first and second jaws 36, 38, having first and second cutting blades 40, 42 mounted thereto respectively. Cylinders 44, 46 interconnect the support frame 35 and jaws 36, 38, as is well known, so that extension of the cylinders 44, 46 brings the blades 40, 42 together in a cutting action, and retraction of the cylinders 44, 46 draws the blades 40, 42 apart. Grapple arms 48 are also movably mounted to the frame 32 adjacent to the upper end thereof, for gripping the tree as is well known.

The frame 32 and body 24 are connected by a pivot 50, such pivot taking the form of a spherical bearing. A first link 52 pivotally interconnects the body 24 and frame 32 on one side of the body 24 and frame 32. The link 52 has one end pivotally connected to the body 24 through a spherical bearing 54, and the other end pivotally connected with the frame 32 through a spherical bearing 56. A second link interconnects the body 24 and frame 32 on the other side of such body 24 and frame 32 so that the first and second links 52, 58 are disposed on either side of the body 24 and on either side of the frame 32. One end of the second link 58 is pivotally connected to the body 24 by means of a spherical bearing 60 and the other end of the link 58 is pivotally connected to the frame 32 by means of a spherical bearing. A single cylinder 64 has its head end 66 pivotally connected relative to the body 24 by means of a spherical bearing 68 and has its rod end 70 pivotally connected relative to the frame 32 by means of a spherical bearing 72.

The cylinder 64 defines a fully extended position upon sufficient introduction of fluid pressure to the head end 66 thereof, rod end pressure, of course, being released during such operation. The cylinder 64 defines a fully retracted position upon introduction of fluid pressure to the rod end 70 thereof, with fluid pressure, of course, being released from the head and 66 thereof (FIG. 5). The extended position of the cylinder 64 determines a tilt position of the frame 32 and shear means 34 in one direction relative to the body 24 and, thus, relative to the vehicle 10, and the retracted position of the cylinder 64 determines a tilt position of the frame 32 and shear means 34 in the other direction relative to the body 24 and thus relative to the vehicle 10. Thus, selective tilting of the frame 32 and shear means 34 about a longitudinal axis of the vehicle 10 is provided.

It should be noted that the forces for extending and retracting the cylinder 64 are different since the piston 74 (FIG. 4) in the cylinder 64 has less area for the pressurized fluid to work on in the rod end thereof. Thus, the cylinder 64 inherently applies more force between the body 24 and frame 32 upon extension thereof than upon retraction thereof. Because of the relative positioning of the spherical bearing 50, and the spherical bearings 68, 72 involving the tilt of the cylinder 64, it is provided that, as the cylinder 64 is initially retracted from the extended position thereof, the cylinder 64 pivots the frame 32 relative to the body 24 through a greater moment arm about the spherical bearing 50 than when the cylinder 64 is initially extended from the retracted position thereof. That is, when fluid pressure is applied to the rod end 70 of the cylinder 64 to move the frame 32 from a tilt position thereof the moment through which the cylinder force is applied is relatively greater, which is as it should be since the cylinder 64 is actually applying less force than when the cylinder 64 is being extended due to the fact that the fluid pressure is applied to a smaller piston area, i.e., the area defined by the piston minus the rod end thereof. On the other hand, upon application of fluid pressure to extend the cylinder 64 from the retracted position thereof, moving the frame 32 from the other full-tilt position thereof, the moment arm through which the cylinder 64 applies force is relatively less. Again, this is as it should be since the cylinder 64 is actually applying greater force than when fluid is applied to the rod end thereof.

During such tilting by the cylinder 64, the links 52, 58 provide effective location and guiding of movement of the frame 32 and shear means 34 relative to the body 32.

In the use of the device, the vehicle 10 is driven to an appropriate location, so that the blades 40, 42, in their open position, can be disposed on either side of a tree. The frame 32 and shear means 34 mounted thereto can be pivoted about an axis transverse of the vehicle 10 through extension and retraction of the cylinder 30 to allow for angling of the tree relative to the vehicle 10. The frame 32 and shear means 34 mounted thereon can also be lifted and lowered relative to the vehicle 10 to allow for differences in terrain from the vehicle 10 to the tree. Furthermore, through actuation of the cylinder 64, the frame 32 and shear means 34 can be tilted along a longitudinal axis of the vehicle 10, to allow for different slopes of ground in the area of the shear means 34 and vehicle 10.

The tree may then be gripped by actuation of the grapple arms 48 and cut by actuation of the cylinders 44, 46. The cylinder 30 can then be actuated to tilt the entire mechanism forwardly, carrying the tree therein, so that the tree can be positioned generally horizontally so as to be laid on the ground after it is cut. The links 52, 58 provide extremely effective support of this great load as the tree is moved to such horizontal position.

What is claimed is:

1. A mounting apparatus for a tree shear mechanism of a vehicle, said tree shear mechanism comprising a frame and shear means operatively mounted thereto, said mounting apparatus comprising:
   a body;
   means mounting the body to the vehicle;
   pivot means interconnecting the body and frame of the tree shear mechanism for providing pivoting of the frame and shear means relative to the body generally about a longitudinal axis of the vehicle;
   link means interconnecting the body and frame for guiding movement of the frame as the frame is pivoted relative to the body about the longitudinal axis of the vehicle through the pivot means interconnecting the body and frame; and
   means for so pivoting the frame relative to the body.

2. The apparatus of claim 1 wherein the link means comprise first and second links, and further comprising first pivot means interconnecting one end of the first link with the body, second pivot means interconnecting the other end of the first link with the frame, third pivot means interconnecting one end of the second link with the body, and fourth pivot means interconnecting the other end of the second link with the frame.

3. The apparatus of claim 2 wherein the pivot means interconnecting the body and frame comprise spherical bearing means.

4. The apparatus of claim 3 wherein each of the first, second, third and fourth pivot means comprise spherical bearing means.

5. The apparatus of claim 4 wherein the first and second links are disposed on either side of the body and on either side of the frame.

6. The apparatus of claim 1 wherein the means for pivoting the frame relative to the body comprise a cylinder, pivot means connecting one end of the cylinder relative to the frame, and pivot means connecting the other end of the cylinder relative to the body.

7. The apparatus of claim 6 wherein the cylinder defines an extended position upon introduction of fluid pressure to the head end thereof, and a retracted position upon introduction of fluid pressure to the rod end thereof, and wherein the pivot means connecting one end of the cylinder relative to the frame is positioned laterally on one side of the pivot means interconnecting the body and the frame, and the pivot means connecting the other end of the cylinder relative to the body is positioned laterally on a second, opposite side of the pivot means interconnecting the body of the frame.

8. The apparatus of claim 7 wherein the extended position of the cylinder determines a tilt position of the frame and shear means in one direction relative to the body, and wherein the retracted position of the cylinder determines a tilt position of the frame and shear means in another direction relative to the body.

9. The apparatus of claim 8 wherein the means mounting the body to the vehicle comprise means for providing that the frame and shear means mounted thereto are pivotable about an axis transverse of the vehicle.

10. The apparatus of claim 9 wherein the means mounting the body to the vehicle comprise means for selectively lifting and lowering the frame relative to the vehicle.

11. The apparatus of claim 1 wherein the means mounting the body to the vehicle comprise means for selectively lifting and lowering the frame relative to the vehicle.

12. The apparatus of claim 11 wherein the means mounting the body to the vehicle comprise means for providing that the frame and shear means may be pivoted about an axis transverse of the vehicle.

13. The apparatus of claim 7 wherein the one end of the cylinder comprises the head end of the cylinder, and wherein the other end of the cylinder cmoprises the rod end of the cylinder.

14. Apparatus for selectively providing pivoting of a first body relative to a second body, comprising:
- pivot means interconnecting the first and second bodies;
- a cylinder;
- pivot means connecting one end of the cylinder relative to the second body;
- pivot means connecting the other end of the cylinder relative to the first body;
- the cylinder defining an extended position upon introduction of fluid pressure to the head end thereof, and a retracted position upon introduction of fluid pressure to the rod end thereof, and wherein the pivot means connecting one end of the cylinder relative to the second body is positioned laterally on one side of the pivot means interconnecting the first and second bodies, and the pivot means connecting the other end of the cylinder relative to the first body is positioned laterally on a second, opposite side of the pivot means interconnecting the first and second bodies.

15. The apparatus of claim 14 wherein the one end of the cylinder comprises the head end of the cylinder, and wherein the other end of the cylinder comprises the rod end of the cylinder.

* * * * *